United States Patent [19]

Bodart et al.

[11] 4,296,493

[45] Oct. 20, 1981

[54] METHOD OF AND ARRANGEMENT FOR REGENERATING START-STOP SIGNALS

[75] Inventors: Robert Bodart; Jean P. A. R. J. Werts, both of Brussels, Belgium

[73] Assignee: U.S. Philips Corporation, New York, N.Y.

[21] Appl. No.: 75,049

[22] Filed: Sep. 12, 1979

[30] Foreign Application Priority Data

Sep. 13, 1978 [NL] Netherlands ......................... 7809299

[51] Int. Cl.³ .............................................. H04L 5/24
[52] U.S. Cl. ...................................................... 370/48
[58] Field of Search ............... 370/48, 97; 179/16 EC, 179/16 EA, 16 H

[56] References Cited

U.S. PATENT DOCUMENTS

| | | | |
|---|---|---|---|
| 3,396,239 | 8/1968 | Yamauchi | 370/48 |
| 3,766,323 | 10/1973 | Wittman | 179/16 EA |
| 4,048,440 | 9/1977 | Peck | 370/48 |
| 4,075,569 | 2/1978 | Wright | 179/16 EC |
| 4,101,732 | 7/1978 | Suzuki | 370/48 |

*Primary Examiner*—David L. Stewart
*Attorney, Agent, or Firm*—Thomas A. Briody; William J. Streeter; Edward W. Goodman

[57] ABSTRACT

A start-stop signal, such as a telex signal, having a stop polarity which is maintained for a period of time after a start-stop transition, is regenerated as a plurality of signal samples which are stored and then used to form an isochronous output signal. The invention resides in having unequal time intervals between the signal samples so that a range of periods of time for the stop polarity can be catered for to produce an isochronous output-signal of satisfactory duration.

2 Claims, 2 Drawing Figures

METHOD OF AND ARRANGEMENT FOR REGENERATING START-STOP SIGNALS

BACKGROUND OF THE INVENTION

The invention relates to a method of regenerating start-stop signals of a type having a stop polarity which is maintained for a certain period of time T after a start-stop transition, T being either greater than or equal to a minimum value, or greater than or equal to a minimum value and smaller than or equal to a maximum value, and of converting the regenerated signals into isochronous output signals, signal samples of the start-stop signals being taken at consecutive sampling instants by means of a regeneration process initiated by the start-stop transition, said signal samples being consecutively stored in a storage device which is read at isochronous instants for forming the isochronous output signals.

The invention also relates to an arrangement for performing a method of the above type.

The invention has application in the field of multiplexing telex signals in accordance with CCITT recommendation R101, wherein one element of a telex signal is represented by one bit in the isochronous signal. The regeneration process used in the multiplexer and based on sampling the consecutive elements is synchronized by the occurrence of each stop-start transition.

The telex signals used for signalling, more particularly those signals which consist of a stop polarity which is maintained for a certain period of time after a start-stop transition, do not have the form of characters and therefore render special measures necessary for their regeneration. It is common practice to start, initiated by the start-stop transition, a regeneration process having consecutive sampling instants which occur at equal time intervals. When this regeneration process is used in tandem arrangements of a plurality of transmission systems wherein alternately the telex signals are converted into isochronous signals and the isochronous signals, by means of direct restitution into telex signals the problem is encountered that the transmission of a signalling pulse of a minimum duration can result in the production at the output of the demultiplexer, after the first repetition of the regeneration process, of a signalling pulse which has a duration which is less than the minimum duration recommended by the CCITT for signalling pulses to be received.

Such signalling pulses are not suitable for further transmission. The realisation of tandem arrangements then require additional measures to increase the pulse duration, or a direct restitution of the telex signals from the isochronous signal is no longer sufficient.

SUMMARY OF THE INVENTION

It is an object of the invention to provide a method of the type described which affords a particularly simple way of implementing a tandem arrangement.

The method according to the invention is characterized in that the signal samples are taken at sampling instants having unequal time intervals between them such that the $(n+1)$st signal sample, wherein $n \geq 7$, is taken at more than $20 \cdot n$ msec. but at less than $20 \cdot n + 5$ msec.after the start-stop transition.

The invention also provides an arrangement for performing this method.

By means of the invention it is achieved that the signalling pulses, after direct restitution, satisfy the limits fixed by the CCITT as regards the duration of signalling pulses to be received, so that the implementation of a tandem arrangement without additional measures is rendered possible.

DESCRIPTION OF THE DRAWING

The invention will now be further explained with reference to the drawing in which by way of example.

DESCRIPTION OF THE PREFERRED EMBODIMENT

Figure 1:
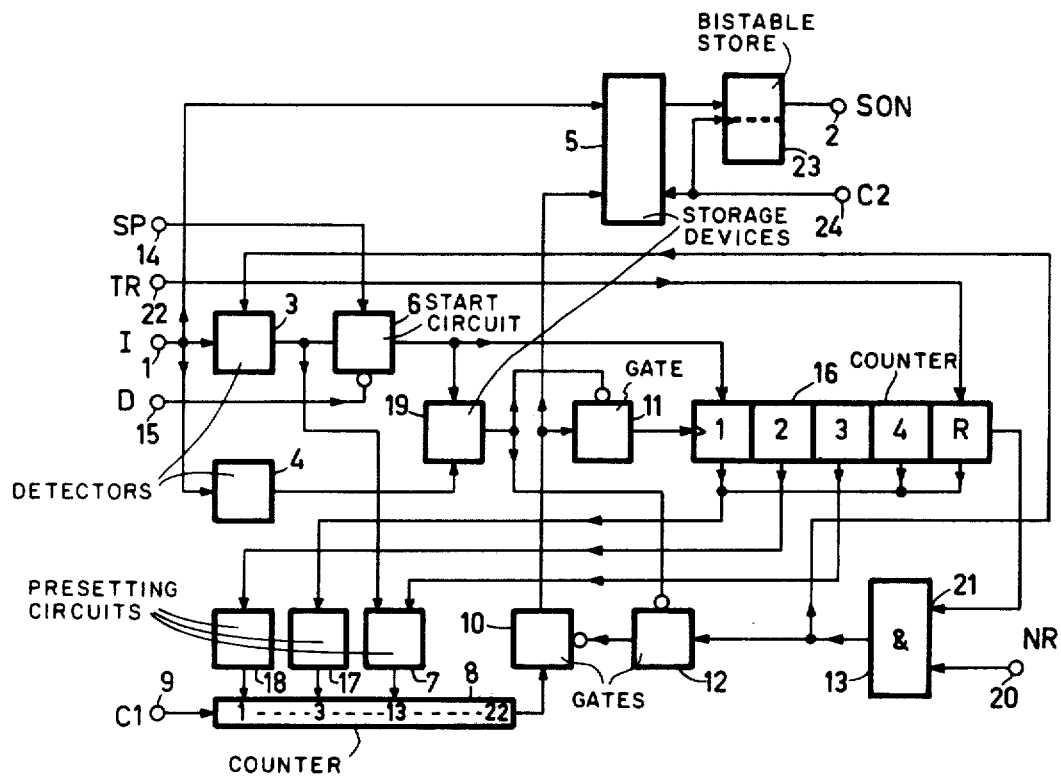
FIG. 1 shows an arrangement according to the invention.

The arrangement of FIG. 1 comprises an input terminal 1 to which telex signals I are applied, and an output terminal 2 from which an isochronous output signal SON is derived. From the input terminal 1, the telex signals I are applied to a detector 3 for detecting start-stop (A–Z) transitions, to a detector 4 for detecting stop-start (Z–A) transitions and to a storage device 5. On the occurrence of an A–Z transition, the detector 3 applies a signal to a start circuit 6 and to a presetting circuit 7 for a counter 8 having 22 counting positions. In response to the signal applied to the circuit 7, the counter 8 is preset to counting position 13 thereby causing a first sampling pulse to occur from the counter 8 after ten clock pulses, (and after 10 msec.) in response to a clock signal C1 of 1 kHz which is applied to an input 9 of the counter 8.

Sampling pulses occurring from the counter 8 are applied to a gate 10 which passes the sampling pulses to a gate 11 and to the storage device 5 only when a regeneration process is being performed. To this end, the gate 10 is controlled by an AND-circuit 13 through a further gate 12.

Through an input terminal 14, a signal SP which indicates that a signalling phase is being performed, that is to say that the signals to be received in that phase are signalling pulses, is applied to the start circuit 6. The start circuit 6 is disabled by a signal D at an input terminal 15 when dial pulses are received. If in the signalling phase, an A–Z transition is detected which is not associated with a transmitted dial pulse, the start circuit 6 sets a counter 16, which is for counting sampling pulses, to a first counting position 1. This counter 16 then applies a signal to a presetting circuit 17 which presets the counter 8 to counting position 3. A second sampling pulse, which causes the counter 16 to be set to counting position 2 through the gates 10 and 11 follows 20 msec. after the occurrence of the first sampling pulse. In this counting position 2, a presetting circuit 18 is activated to preset the counter 8 to counting position 1, so that a further sampling pulse is produced 22 msec. thereafter.

In a similar manner further sampling pulses are thereafter produced after 10 msec. and again after 20 msec. Thereafter, the counter 16 is in the quiescent state R and sampling pulses are produced every 20 msec. by the counter 8 through the presetting circuit 17 until a Z–A transition is detected by the detector 4. The gate 11 is then blocked via a storage device 19 to which the output signal of the start circuit 6 is also applied.

The AND-circuit 13 receives at an input 20 a signal NR if no regeneration process is being performed for start-stop signals other than the pulses having Z-polarity considered here, and receives at an input 21 a signal when counter 16 is in the quiescent state R. Then AND-circuit 13 produces an output signal which blocks the gate 10 via the gate 12, so that no sampling pulses can be passed unless the gate 12 itself is blocked by a signal from the storage device 19, indicating that no Z-A transition has yet been detected and that, consequently, the regeneration process must continue.

The output signal of the AND-circuit 13 is also applied to the detector 3 in order to prepare the latter for the detection of a next A-Z transition.

If an unwanted A-Z transition occurs, a signal TR, which sets counter 16 to the quiescent state R, is received via an input 22.

The sampling pulses applied to the storage device 5 ensure that signal samples of the telex signals I, which are applied to the input terminal 1, are entered into this storage device 5. Reading of the storage device 5 is performed by means of a bistable store 23 under the control of a clock signal C2 applied to a terminal 24 and having a frequency of (48/47)·50 Hz, so that every 19(7/12) msec. a stored signal sample contributes to the isochronous output signal SON at the output terminal 2.

Figure 2:
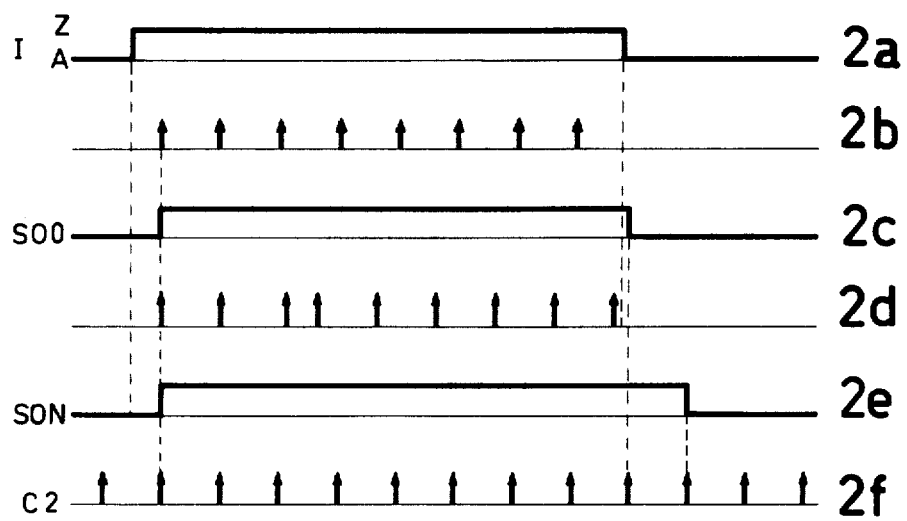
FIG. 2 shows some time diagrams therefor.

FIG. 2a illustrates a telex signal I consisting of a stop polarity Z maintained for 165 msec. after the A-Z transition. In the customary sampling procedure of this signal, effected every 20 msec., starting 10 msec. after the A-Z transition, eight signal samples are taken at the sampling instants indicated in FIG. 2b, which signal samples produce, after direct restitution under the control of the clock signal C2 shown in FIG. 2f, the signal SOO shown in FIG. 2c. This signal SOO has a duration of $8 \times 19(7/12)$ msec. = $156\frac{2}{3}$ msec., which, for a busy signal having a minimum duration of 165 msec. (CCITT type B signalling) means such a degradation that the restituted signal no longer satisfies CCITT recommendation U1.

When, however, in accordance with the invention, signal samples are taken at sampling instants having unequal time intervals between them, as shown in FIG. 2d, the signal SON, shown in FIG. 2e, having a duration of $9 \times 19(7/12)$ msec. = $176\frac{1}{4}$ msec. is produced after direct restitution by means of the clock signal C2 of FIG. 2f.

The sampling instants shown in FIG. 2d are successively located at 10, 30, 52, 62, 82, 102, 122, 142 and 162 msec. after the A-Z transition of the telex signal I. The location of these sampling instants within the limits indicated by the invention is so chosen that in an arrangement for the regeneration of start-stop signals, use can be made of the presetting circuits and counter which are already present for other purposes, as described in U.S. patent application Ser. No. 191,098, filed Sept. 16, 1980, which is a continuation of U.S. patent application Ser. No. 38,759, filed May 14, 1979.

The described method and arrangement can be used for the following signalling pulses consisting of a stop-polarity maintained for a given period of time:

(a) Busy signal (CCITT type B signalling) having a duration of 165-260 msec.

(b) Call signal (CCITT type C signalling) having a duration of 150-300 msec.

(c) Reception confirmation signal (CCITT type C signalling) having a duration of 405-495 msec.

(d) Invitation to dialling (CCITT type C signalling) having a duration of more than 450 msec.

It is simple to verify for these signals that the following numbers of signal samples are taken: for the signal (a) 9-13, for the signal (b) 8-15, for the signal (c) 21-25 and for the signal (d) at least 23; so that on direct restitution with the clock signal C2, pulses are produced having a duration of: $176\frac{1}{4}$ to 254(7/12) msec. $156\frac{2}{3}$ to $293\frac{3}{4}$ msec., $411\frac{1}{4}$ to 489(7/12) msec. and at least 450(5/12) msec., respectively.

What is claimed is:

1. A method of regenerating start-stop signals having a stop polarity which is maintained for a certain period of time T after a start-stop transition, T being either greater than or equal to a minimum value, or greater than or equal to a minimum value and smaller than or equal to a maximum value, and of converting the regenerated signals into isochronous output signals, wherein the method includes taking signal samples of the start-stop signals at consecutive sampling instants by means of a regeneration process initiated by the start-stop transition, consecutively storing said signal samples in a storage device and reading out the stored signal samples at isochronous instants for forming the isochronous output signals, characterized in that the method comprises taking the signal samples at sampling instants having unequal time intervals between them such that the $(n+1)^{st}$ signal sample, wherein $n \geq 7$, is taken at more than $20 \cdot n$ msec. but less than $20 \cdot n + 5$ msec. after the start-stop transition.

2. An arrangement for regenerating start-stop signals having a stop polarity which is maintained for a certain period of time T after a start-stop transition, T being either greater than or equal to a minimum value, or greater than or equal to a minimum value and smaller than or equal to a maximum value and for converting the regenerated signals into isochronous output signals, comprising means for sampling the start-stop signals at consecutive sampling instants, a storage device coupled to said sampling means for storing the signal samples and means coupled to said storage device for reading the storage device at isochronous instants, characterized in that said arrangement further comprises means coupled to said sampling means for determining, in accordance with a fixed pattern, unequal time intervals between consecutive sampling instants such that the $(n+1)^{st}$ sampling instants, wherein $n \geq 7$, is located at more than $20 \cdot n$ msec. but at less than $20 \cdot n + 5$ msec. after the start-stop transition.

* * * * *